(12) United States Patent
Wilson et al.

(10) Patent No.: US 6,540,226 B1
(45) Date of Patent: Apr. 1, 2003

(54) APPARATUS FOR A DOCUMENT PROCESSING SYSTEM

(75) Inventors: Owen H. Wilson, Kitchener (CA); Richard A. Fairey, Kitchener (CA)

(73) Assignee: NCR Corporation, Dayton, OH (US)

( * ) Notice: Subject to any disclaimer, the term of this patent is extended or adjusted under 35 U.S.C. 154(b) by 75 days.

(21) Appl. No.: 09/716,190

(22) Filed: Nov. 17, 2000

(51) Int. Cl.[7] .................. B65H 5/00; B25B 27/14; B25G 3/00
(52) U.S. Cl. .............. 271/264; 29/271; 248/224.8; 403/14; 403/253; 403/286; 403/294
(58) Field of Search ............... 271/264; 211/126.2; 248/224.8; 403/13, 14, 294, 286, 253; 29/271

(56) References Cited

U.S. PATENT DOCUMENTS

| | | | | |
|---|---|---|---|---|
| 2,681,483 A | * | 6/1954 | Morawetz | 403/14 |
| 5,156,481 A | * | 10/1992 | Overbay et al. | 403/14 |
| 5,380,118 A | * | 1/1995 | Stahlecker et al. | 403/14 |
| 5,392,710 A | * | 2/1995 | Li | 271/264 |
| 6,171,195 B1 | * | 1/2001 | Ferguson | 403/13 |
| 6,200,059 B1 | * | 3/2001 | Sawdon et al. | 403/13 |

* cited by examiner

*Primary Examiner*—Michael R. Mansen
(74) *Attorney, Agent, or Firm*—Michael Chan; Francis L. Conte

(57) ABSTRACT

An upstream module has a document transport path portion, and a downstream module has a document transport path portion. The modules are aligned such that a waterfall effect is created from the document path portion of the upstream module to the document path portion of the downstream module.

28 Claims, 8 Drawing Sheets

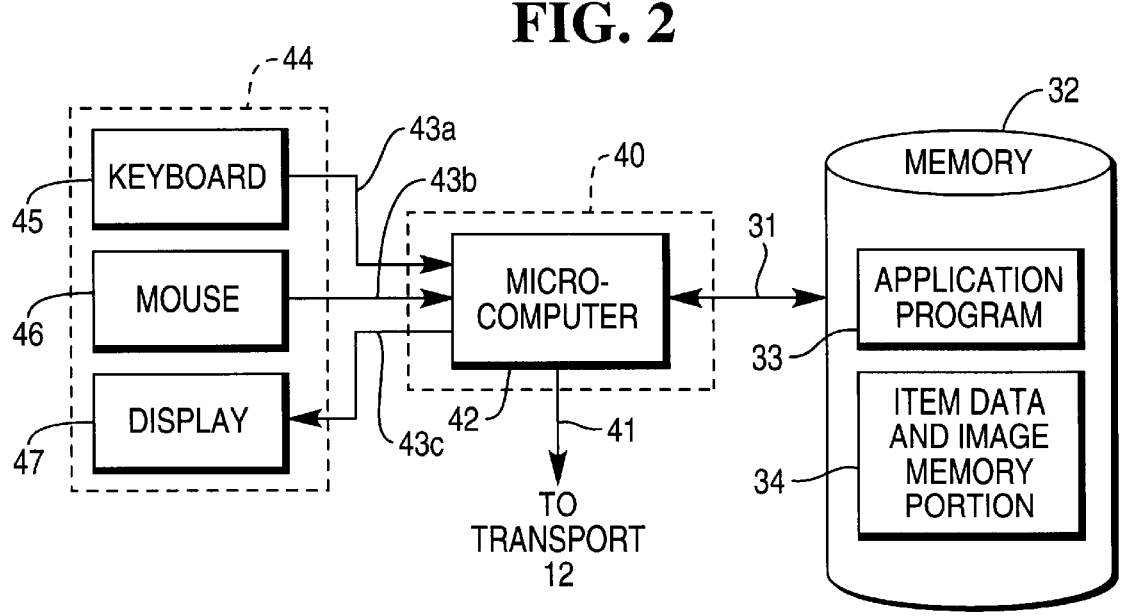
FIG. 2
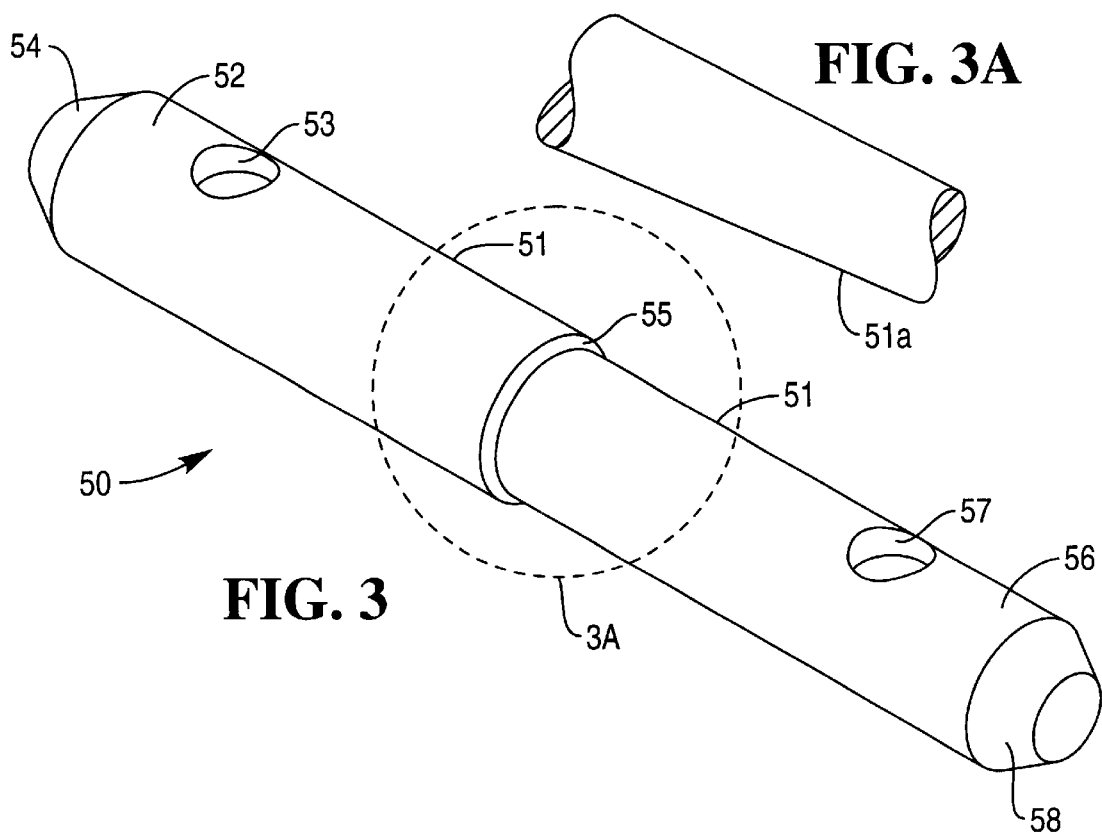
FIG. 3A
FIG. 3

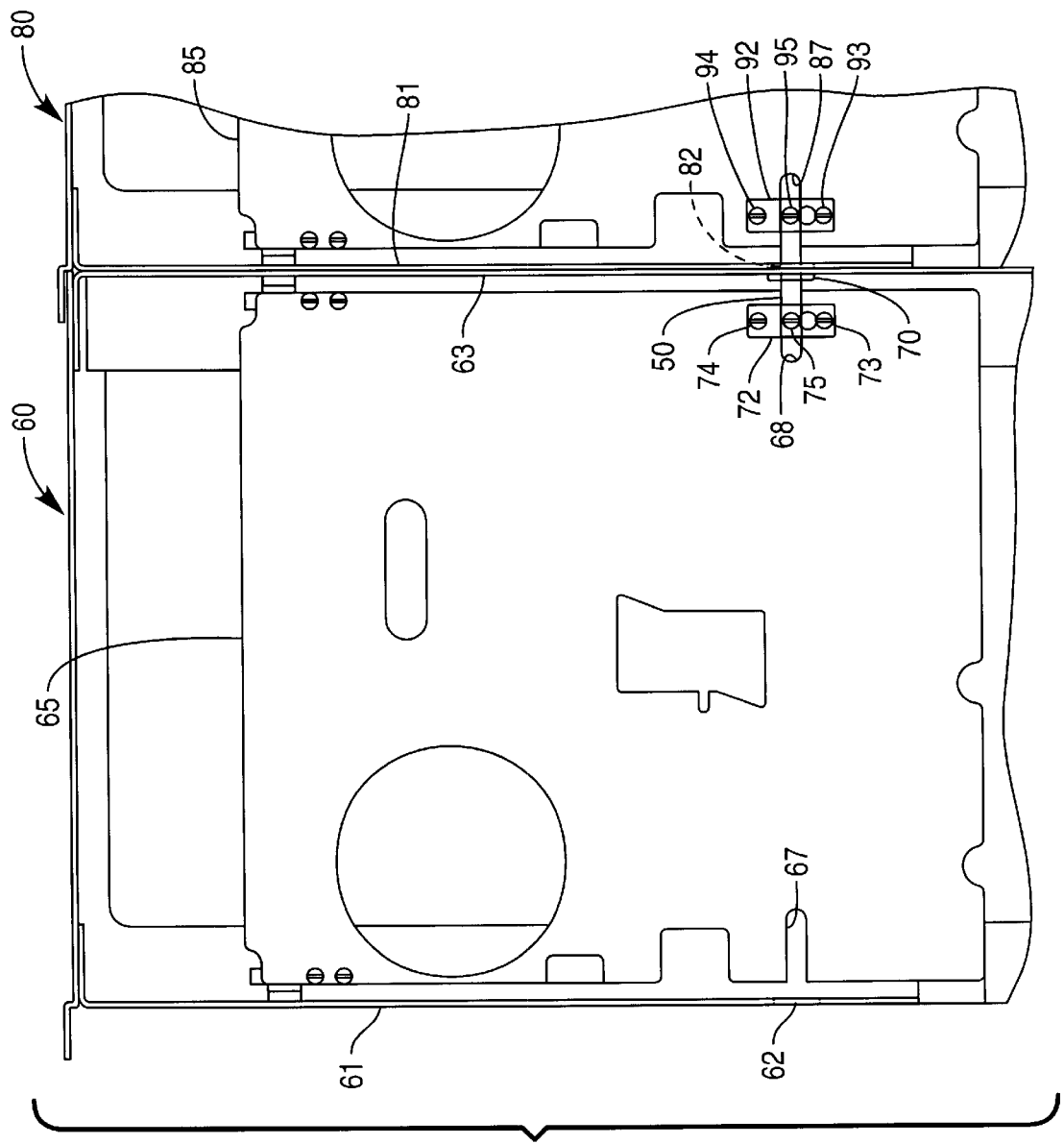

APPARATUS FOR A DOCUMENT PROCESSING SYSTEM

BACKGROUND OF THE INVENTION

The present invention relates to alignment of a document path, and is particularly directed to an apparatus for a document processing system, such as an image-based check processing system, to align a document transport path which extends between adjacent modules of the system.

A typical image-based check processing system includes a check processing transport having a number of different modules. Each module defines a portion of a document transport path which extends from an upstream end of the check processing transport to a downstream end of the check processing transport. Each module also includes a number of hardware devices positioned along the document transport path for performing specific document processing operations on documents moving downstream along the document transport path.

The check processing system further includes a transport processor which executes a transport application program which is stored in memory to control operation of the devices positioned along the document transport path and thereby to control operation of the check processing transport.

A check processing transport usually includes a number of different modules such as a document feeder module, a codeline reader module, an image capture module, an encoder module, an endorser module, a bank stamp module, and a pocket module. The document feeder module includes a hopper into which a stack of financial documents including checks are placed. A document feeder adjacent the hopper selectively feeds or drives each document from the stack of documents in the hopper to transport the document from the upstream end to the downstream end along the document transport path. The document is transported past the codeline reader module, the image capture module, the encoder module, the endorser module, the bank stamp module, and into pockets of the pocket module located at the downstream end of the document transport path.

When the modules of a check processing transport are initially installed, adjacent modules need to aligned relative to each other so that the portion of the document transport path passing through one module aligns with the portion of the document transport path passing through the other module. This alignment is needed to avoid document jams as each document moves along the document transport path from the module which is towards the upstream end to its adjacent module which is towards the downstream end. Adjacent modules are currently adjusted vertically and horizontally (i.e., front to back) to align the modules relative to each other. Much time is usually required to adjust adjacent modules to align the modules relative to each other. Accordingly, much cost is usually involved. It would be desirable to reduce costs associated with adjusting adjacent modules of a check processing transport to align the modules relative to each other.

SUMMARY OF THE INVENTION

In accordance with one aspect of the present invention, an apparatus is provided for aligning a document transport path of an upstream module and a document transport path of a downstream module in a document processing system. The apparatus comprises a first end portion having a diameter and for aligning with the upstream module. A second end portion has a diameter which is smaller than the diameter of the first end portion and is provided for aligning with the downstream module such that the document transport path of the upstream module an the document transport path of the downstream module align with each other.

The apparatus may comprise a central portion which interconnects the first and second end portions to provide a stepped surface which extends between the first and second end portions. Alternatively, the central portion may include a tapered surface which extends between the first and second end portions. At least one of the first and second end portions may have a threaded hole for enabling that end portion to be secured to an associated module. Alternatively, each of the first and second end portions may have a threaded hole for enabling that end portion to be secured to an associated module.

In accordance with another aspect of the present invention, an apparatus comprises an upstream module including means defining a document transport path portion, and a downstream module including means defining a document transport path portion. Means is provided for aligning the modules such that a waterfall effect is created from the document path portion of the upstream module to the document path portion of the downstream module.

The aligning means may comprise a pin including (i) a first end portion having a diameter and for aligning with the upstream module, and (ii) a second end portion having a diameter which is smaller than the diameter of the first end portion and for aligning with the downstream module such that the document transport path of the upstream module and the document transport path of the downstream module align with each other. The apparatus may comprise a central portion which interconnects the first and second end portions to provide a stepped surface which extends between the first and second end portions. Alternatively, the apparatus may comprise a central portion which interconnects the first and second end portions to provide a tapered surface which extends between the first and second end portions.

The aligning means may comprise (i) a pin and (ii) a pin attachment plate including means defining an undercut portion which engages the pin to allow the document transport path of the upstream module and the document transport path of the downstream module to align with each other such that the waterfall effect is created from the document path portion of the upstream module to the document path portion of the downstream module. Alternatively, the aligning means may comprise (i) a pin and (ii) a baseplate including means defining a protrusion portion which engages the pin to allow the document transport path of the upstream module and the document transport path of the downstream module to align with each other such that the waterfall effect is created from the document path portion of the upstream module to the document path portion of the downstream module.

In accordance with yet another aspect of the present invention, an apparatus comprises an upstream module including means defining a document transport path portion, and a downstream module including means defining a document transport path portion. A pin includes (i) a first end portion having a diameter and for aligning with the upstream module, and (ii) a second end portion having a diameter which is smaller than the diameter of the first end portion and for aligning with the downstream module such that the document transport path of the upstream module and the document transport path of the downstream module align with each other.

The apparatus may comprise a central portion which interconnects the first and second end portions to provide a stepped surface which extends between the first and second end portions. Alternatively, the apparatus may comprise a central portion which interconnects the first and second end portions to provide a tapered surface which extends between the first and second end portions. At least one of the first and second end portions may include means defining a threaded hole for enabling that end portion to be secured to an associated module. Alternatively, each of the first and second end portions may include means defining a threaded hole for enabling that end portion to be secured to an associated module.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a schematic block representation of a portion of FIG. 1;

FIG. 3 is a perspective view of an alignment pin in accordance with a first embodiment of the present invention;

FIG. 3A is a perspective view of a central portion of the alignment pin, illustrated within the circle labeled 3A of FIG. 3, in accordance with an alternate embodiment of the present invention.

FIG. 9 is a view similar to FIG. 8 and showing an additional pin attachment plate attached to one of the frame parts;

DETAILS OF THE INVENTION

Figure 1:
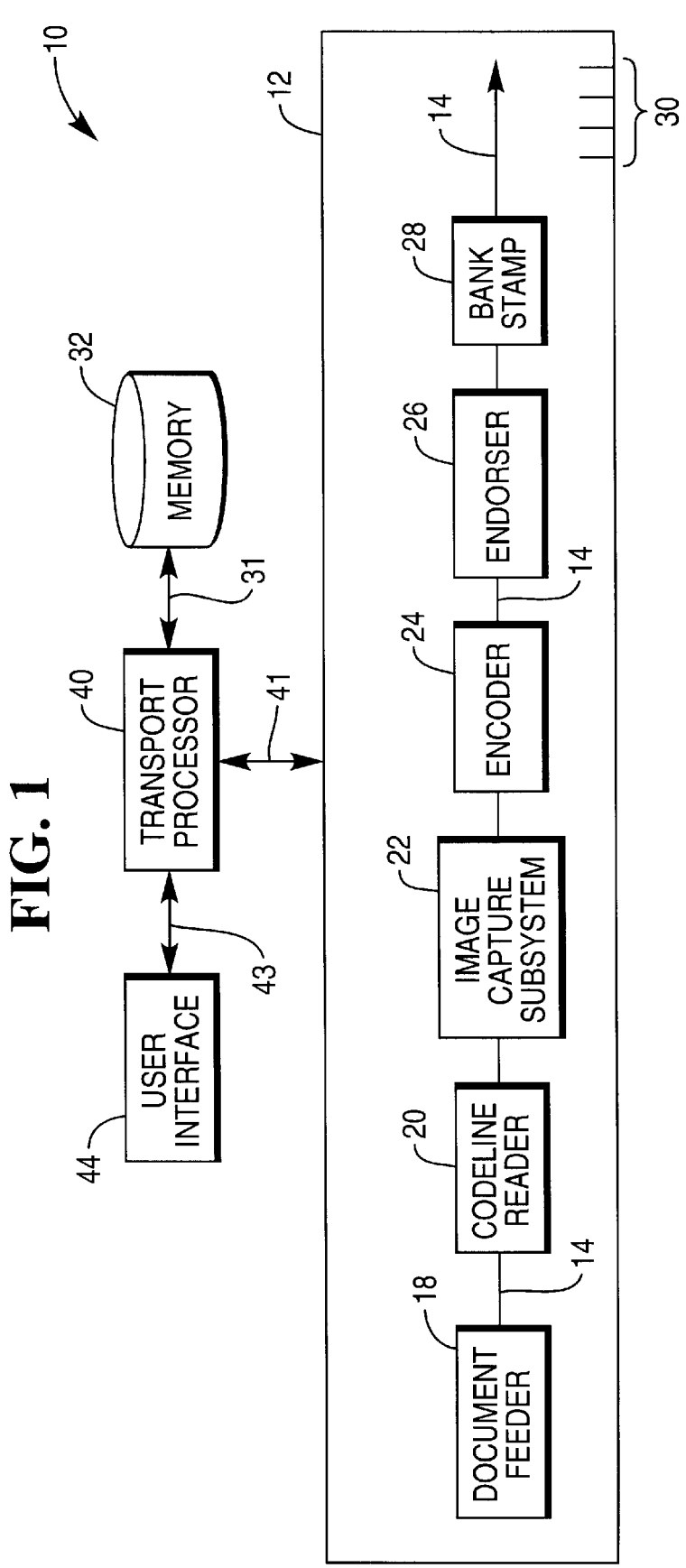
FIG. 1 is a schematic block representation of a check processing transport embodying the present invention.

The present invention is directed to alignment of a document transport path which extends between adjacent modules of a document processing system. The specific construction and use of the document processing system may vary. By way of example, a document processing system in the form of an image-based check processing system 10 is illustrated in FIG. 1. The check processing system 10 may be, for example, a sorting machine or a proof machine wherein financial documents such as checks are processed in a bank.

Referring to FIG. 1, the check processing system 10 includes a check processing transport 12 having a document track which defines a document transport path 14 along which financial documents, such as checks, can be transported from an upstream end to a downstream end. The transport 12 comprises a number of different modules including a document feeder 18, a codeline reader 20, an image capture subsystem 22, an encoder 24, an endorser 26, an a bank stamp 28. Each module defines a portion of the document transport path 14. Each module includes a number of different hardware devices lying along the document transport path 14 for performing specific document processing operations on documents moving along the document transport path. More specifically, the document feeder 18 includes a hopper (not shown) into which a stack of financial documents including checks are placed. A feeder mechanism (also not shown) is adjacent to the hopper and selectively feeds or drives each document from the stack of documents in the hopper to transport the document from the upstream end to the downstream end along the document transport path 14 to sorting pockets 30 located at the end of the document transport path.

The codeline reader 20 may comprise a MICR reader which reads a MICR codeline from each check being processed in a known manner. Alternatively, the codeline reader 20 may be an OCR reader instead of a MICR reader depending upon on the particular application.

The image capture subsystem 22 is located along the document transport path 14. The image capture subsystem 22 captures an image of each document for a number of different purposes well known in the financial industry. More specifically, the image capture subsystem 22 includes an imaging camera (not shown) which is controlled to capture images of documents moving along the document transport path 14. The encoder 24 encodes missing fields on each check The endorser 26 applies an endorsement in a known manner to each check. The bank stamp 28 stamps each check to identify the bank institution processing the check. The structure and operation of MICR readers, OCR readers, imaging cameras, encoders, endorsers, and bank stamps are well known and, therefore, will not be described.

Referring to FIGS. 1 and 2, the check processing system 10 further includes a transport processor 40 and a user interface 44 which communicates via signals on line 43 (FIG. 1) with a microcomputer 42 of the transport processor 40. More specifically, the user interface 44 includes a keyboard 45, a mouse 46, and a display 47, all of which communicate via signals on lines 43a, 43b, 43c (FIG. 2), respectively, with the microcomputer 42. The microcomputer 42 controls operation of the transport 12 via signals on line 41. Suitable microcomputers and memories are readily available in the marketplace. Their structure and operation are well known and, therefore, will not be described.

The check processing system 10 also includes a memory 32 which communicates via signals on line 31 with the microcomputer 42. It is contemplated that the memory 32 could be a single memory unit or a plurality of different memory units. An executable transport application program 33 is stored in the memory 32. The transport application program 33 is associated with a particular type of document processing work. For example, one type of work is proof of deposit. Another type of work is remittance processing. Still another type of work may be sorting of items. When the transport application program 33 is executed, the hardware devices lying along the document transport path 14 are controlled to process items moving downstream along the document transport path 14 in accordance with the transport application program, as is known. The memory 32 includes an item data and image memory portion 34 which stores sequence numbers, MICR codelines, image data, encoder status, endorsement status, and bank stamp status associated with transaction items which have been processed in accordance with the transport application program 33.

Referring to FIG. 3, a generally cylindrical-shaped pin 50 includes a central portion 51 which interconnects a first end portion 52 and a second end portion 56. The first end portion 52 has a threaded hole 53 and a chamfered surface 54 associated therewith. Similarly, the second end portion 56 has a threaded hole 57 and a chamfered surface 58 associated therewith. Preferably, the central portion 51 includes a stepped surface 55 which interconnects the first end portion 52 which has a relatively larger diameter and the second end portion 56 which has a relatively smaller diameter. It should be noted that the stepped surface 55 is shown exaggerated in FIG. 3 for purposes of-illustration.

Figure 4:
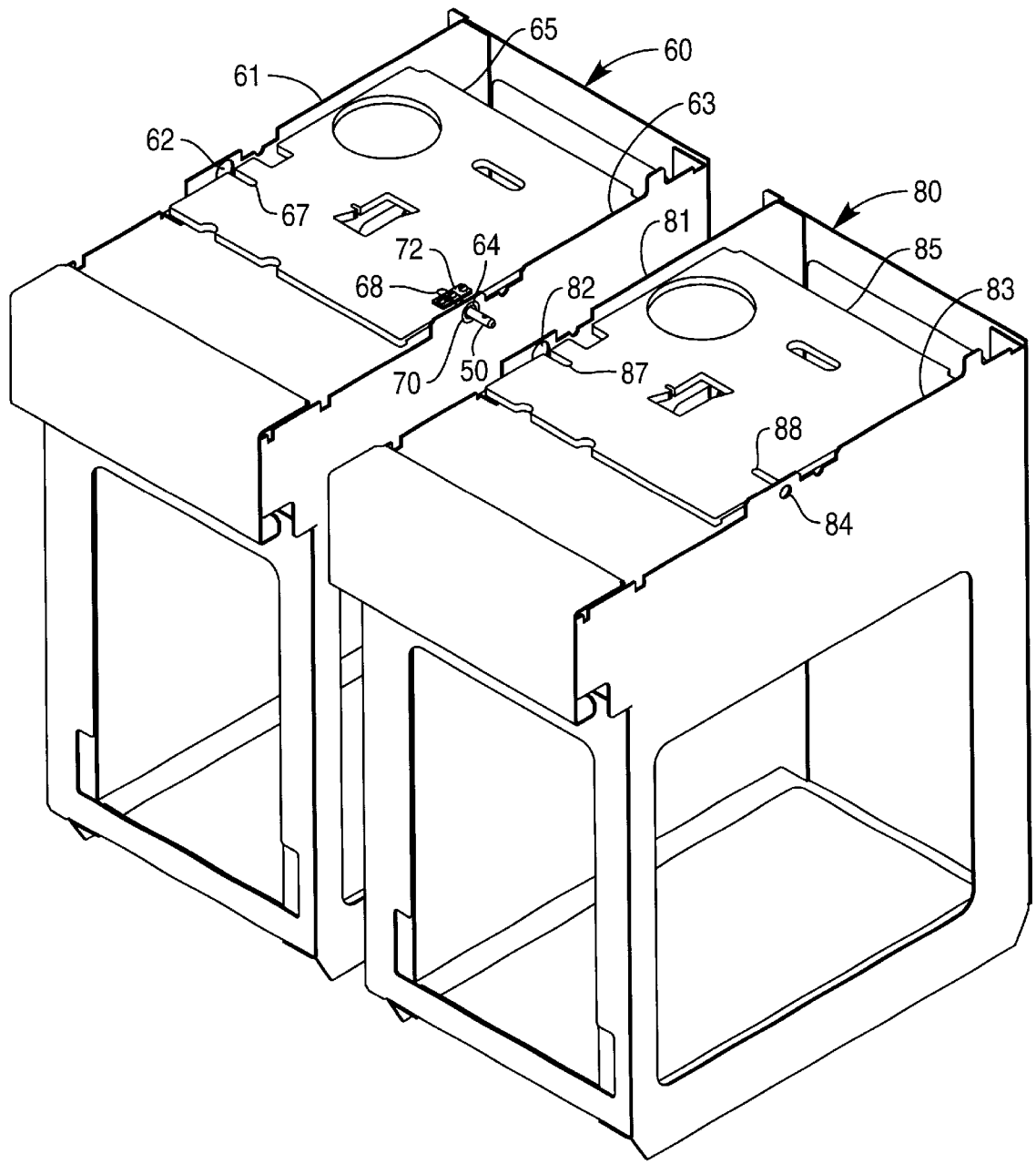
FIG. 4 is a perspective view of frame parts of a check processing transport embodying the alignment pin of FIG. 3.

Referring to FIG. 4, a frame part 60 of an upstream module of the transport 12 and a frame part 80 of a downstream module of the transport are shown spaced apart from each other and with hardware components removed. The upstream and downstream modules may be any two modules which are adjacent to each other. For example, as shown in FIG. 1, the upstream module could be the encoder 24 and the downstream module the endorser 26. As another example, the upstream module could be the document feeder 18 and the downstream module the codeline reader 20. The frame part 60 shown in FIG. 4 is upstream from the frame part 80, and the frame part 80 is downstream from the frame part 60. The upstream frame part 60 includes an upstream side 61 having a hole 62, and a downstream side 63 having a hole 64. Similarly, the downstream frame part 80 includes an upstream side 81 having a hole 82, and a downstream side 83 having a hole 84. The frame parts 60, 80 are adjacent to each other, and are aligned relative to each other such that the hole 64 in the downstream side 63 of the upstream frame part 60 and the hole 82 in the upstream side S1 of the downstream frame part 80 face each other.

Figure 5:
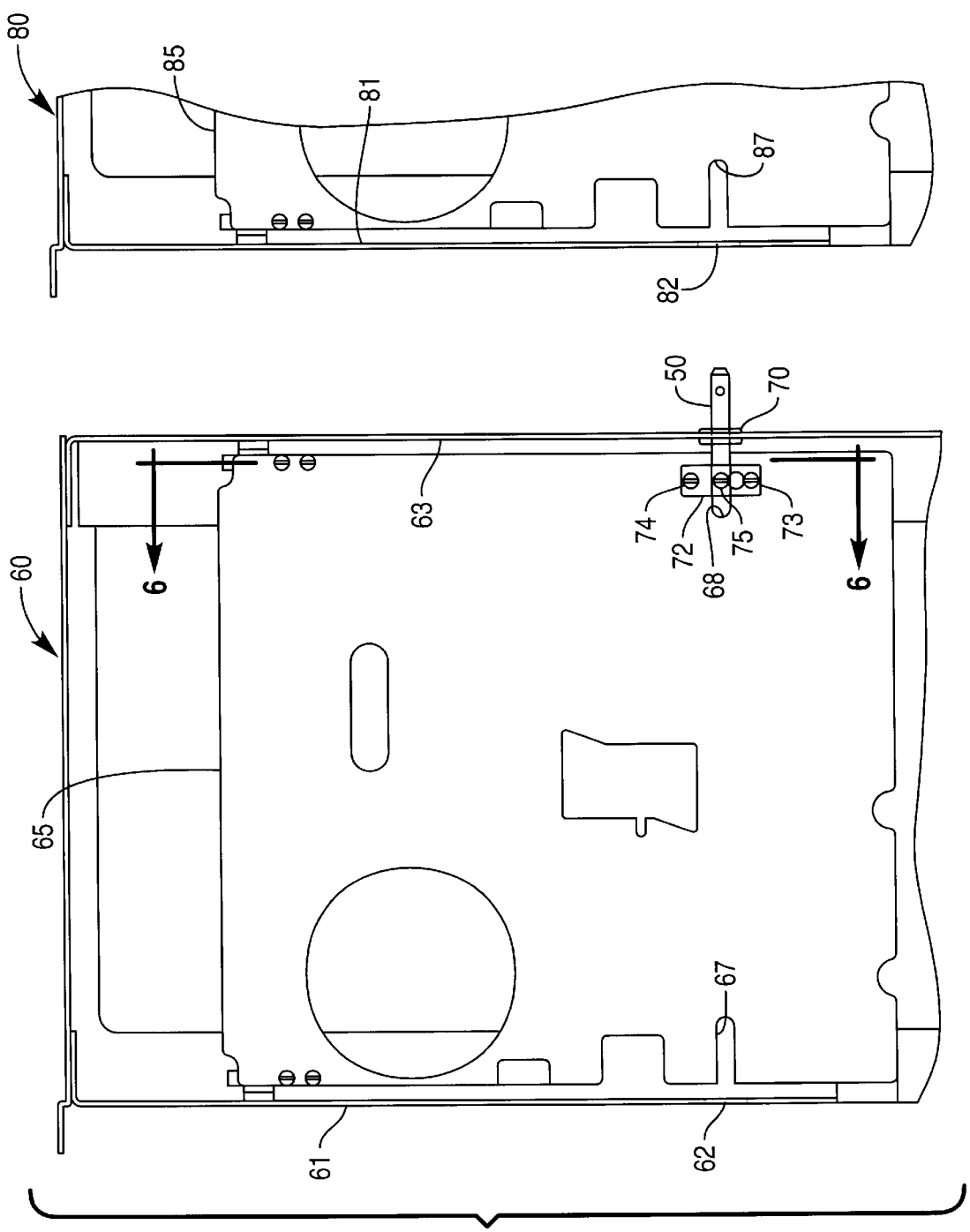
FIG. 5 is a top view of the frame parts of FIG. 4.
Figure 6:
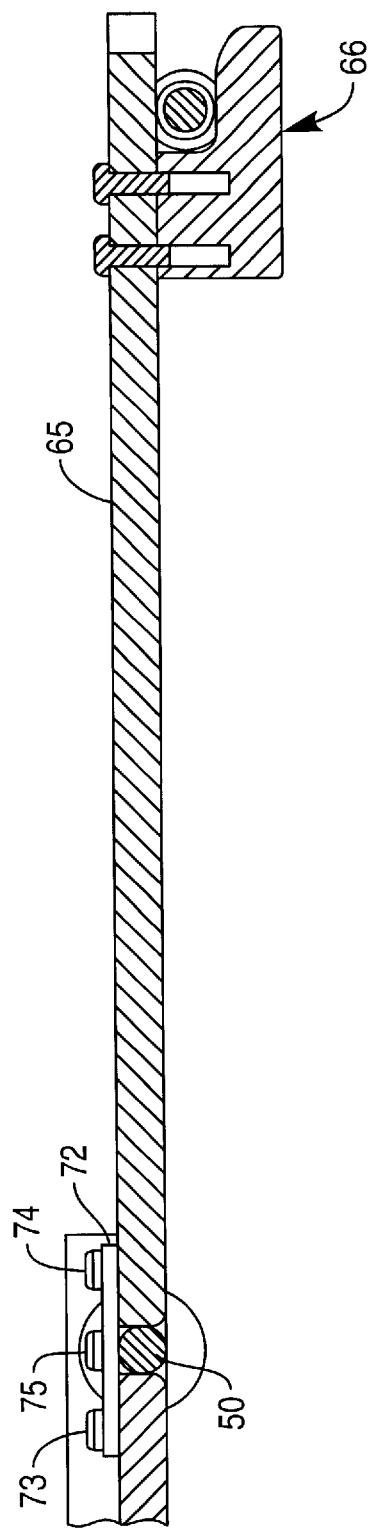
FIG. 6 is a side view, taken approximately along line 6—6 shown in FIG. 4.

Referring to FIGS. 4 and 5, a baseplate 65 is disposed within the upstream frame part 60. The baseplate 65 has a number of holes in which module components can be mounted and through which electrical cables and the like can pass between the top and bottom sides of the baseplate. One end of the baseplate 65 is pivotally mounted about a pair of floating hinge pins 66 (as best shown in FIG. 6) in a known manner. The baseplate 65 has an elongate-shaped slot 67 which faces the hole 62 in the upstream side 61 of the upstream frame part 60, and another elongate-shaped slot 68 which faces the hole 64 in the downstream side 63 of the upstream frame part 60.

Similarly, a baseplate 85 is disposed with the downstream frame part 80. The baseplate 85 has a number of holes in which module components can be mounted and through which electrical cables and the like can pass between the top and bottom sides of the baseplate. One end of the baseplate 85 is pivotally mounted about a pair of floating hinge pins (like those pins 66 shown in FIG. 6) in a known manner. The baseplate 85 has an elongate-shaped slot 87 which faces the hole 82 in the upstream side 81 of the downstream frame part 80, and another elongate-shaped slot 88 which faces the hole 84 in the downstream side 83 of the downstream frame part 80.

Figure 7:
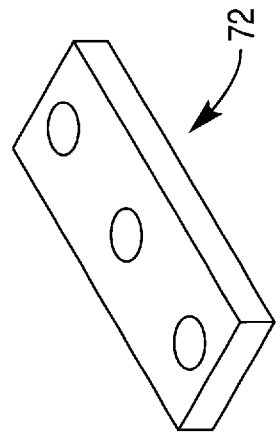
FIG. 7 is an enlarged perspective view of a pin attachment plate shown in FIGS. 4 and 5.

Referring to FIGS. 4, 5, and 6, a grommet 70 is inserted in the hole 64 in the downstream side 63 of the upstream frame part 60. The first end portion 52 of the alignment pin 50 shown in FIG. 3 extends through grommet 70 and into the slot 68 of the baseplate 65. A first pin attachment plate 72, as shown in FIG. 7, is placed on the baseplate 65. Two end screws 73, 74 secure the plate 72 to the baseplate 65 in a known manner. A center screw 75 is screwed into the threaded hole 53 of the alignment pin 50 to secure the plate 72 and the alignment pin 50 to each other.

Figure 8:
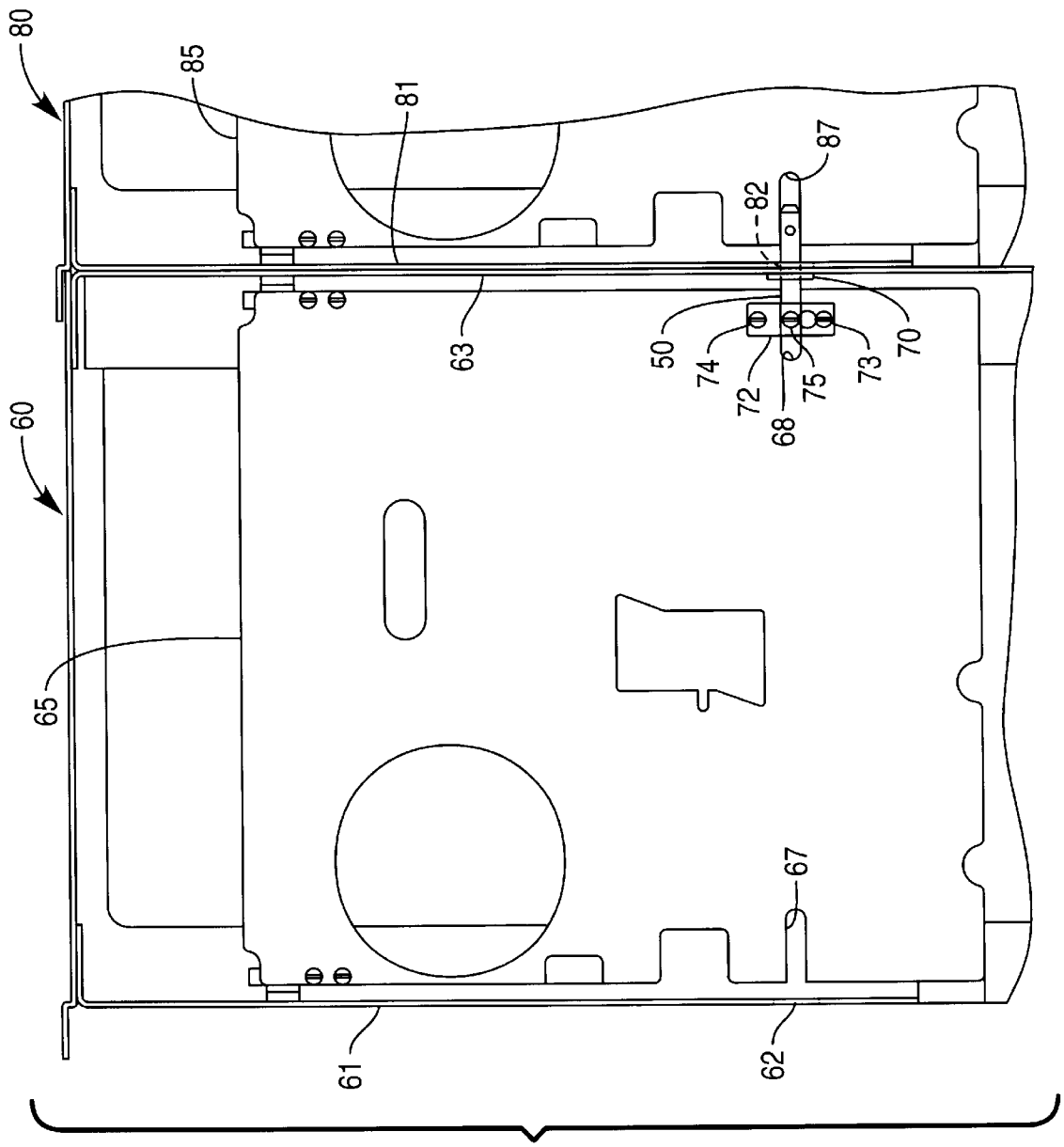
FIG. 8 is a view similar to FIG. 5 and showing the frame parts in different positions.

When the frame parts 60, 80 are moved from their relative positions shown in FIG. 5 to relative positions shown in FIG. 8, the second end portion 56 of the alignment pin 50 extends through the hole 82 into the slot 87 of the baseplate 85. The hole 82 acts as a clearance hole for the grommet 70 when the frame parts 60, 80 are in their positions as shown in FIG. 8. After the frame parts 60, 80 are moved to the relative positions shown in FIG. 8, a second pin attachment plate 92 is placed on the baseplate 85 as shown in FIG. 9. The second pin attachment plate 92 has the same construction as the first pin attachment plate 72 shown in FIG. 7. Two end screws 93, 94 secure the plate 92 to the baseplate 85 in a known manner. A center screw 95 is screwed into the threaded hole 57 of the alignment pin 50 to secure the plate 92 and the alignment pin 50 to each other.

When the frame parts 60, 80 are aligned relative to each other as shown in FIG. 8, a "waterfall" effect is created in the document transport path 14 (shown only in FIG. 1) which extends between the upstream baseplate 65 and the downstream baseplate 85. This waterfall effect in the document transport path 14 occurs due to the stepped surface of the alignment pin 50.

A number of advantages result by providing the alignment pin 50 in accordance with the present invention. One advantage is that the amount of time required to align adjacent modules is reduced. Accordingly, a field start-up engineer can more quickly install modules in the check processing transport 12 and, therefore, more quickly bring the check processing transport into operation. This results in higher productivity of field engineers. Also, less training of field engineers is needed.

Another advantage is that there is less chance of a document jam condition due to a collision of a moving document with the bottom of the document transport path 14 when the document moves from the upstream module to the downstream module.

Still another advantage is that adjacent modules can be adjusted vertically and horizontally (i.e., front to back) with minimum tolerance and no adjustment. The adjacent modules are adjusted such that the bottom of portion of the document transport path 14 passing through the upstream module is aligned with the bottom of the portion of the document transport path passing through the downstream module.

Although the above description describes the central portion 51 of the alignment pin 50 as having a stepped surface 55, it is contemplated that the central portion 51a may have a tapered surface instead of the stepped surface, as shown in an alternate embodiment in FIG. 3A.

Also, although the above description describes a waterfall effect as a result of the central portion 51 alignment pin 50 having the stepped surface 55, it is contemplated that there are other ways to achieve the desired waterfall effect.

Figure 11:
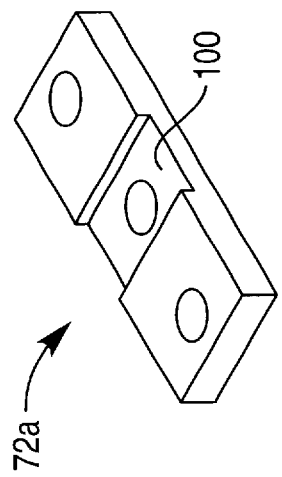
FIG. 11 is a perspective view of the pin attachment plate of FIG. 10 rotated about its lengthwise axis.
Figure 10:
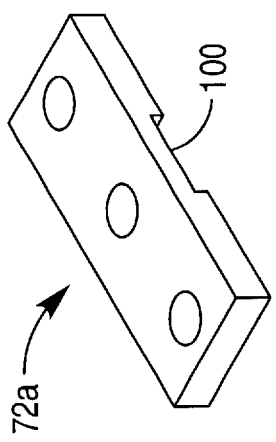
FIG. 10 is a perspective view similar to FIG. 7 and showing a pin attachment plate in accordance with a second embodiment of the present invention.

A second embodiment of the present invention is illustrated in FIGS. 10 and 11. Since the embodiment of the invention illustrated in FIGS. 10 and 11 is generally similar to the embodiment illustrated in FIGS. 1–9, similar numerals are utilized to designate similar components, the suffix letter "a" being associated with the embodiment of FIGS. 10 and 11 to avoid confusion. As shown in FIGS. 10 and 11, the pin attachment plate 72a may be used to secure an alignment pin with a downstream baseplate. It should be noted that the view shown in FIG. 11 is a perspective view looking from the bottom side of FIG. 10. The pin attachment plate 72a shown in FIGS. 10 and 11 has an undercut 100 in the vicinity of its center hole through which a screw attaches the alignment pin with the baseplate of the downstream module. In this embodiment, it should be apparent that the alignment pin need not have a stepped or tapered surface to provide the desired waterfall effect. The central portion of the alignment pin may have a straight surface which interconnects end portions which have the same diameter.

Figure 12:
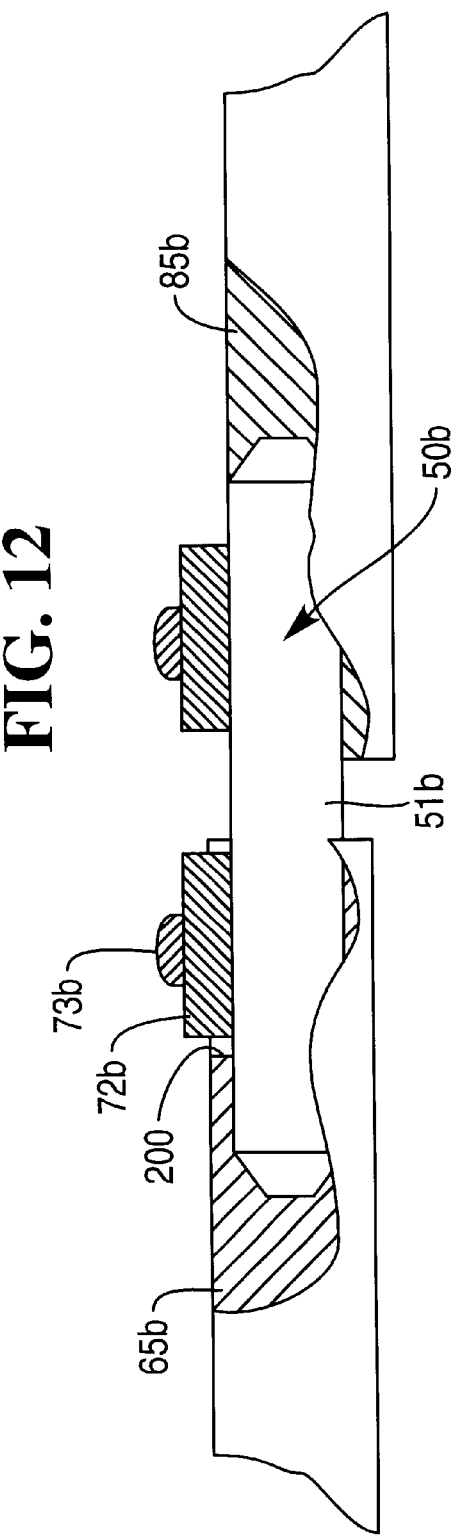
FIG. 12 is a sectional view, with certain parts removed, of upstream and downstream baseplates in accordance with a third embodiment of the present invention.

A third embodiment of the present invention is illustrated in FIG. 12. Since the embodiment of the invention illustrated in FIG. 12 is generally similar to the embodiment illustrated in FIGS. 1–9, similar numerals are utilized to designate similar components, the suffix letter "b" being associated with the embodiment of FIG. 12 to avoid confusion. It should be noted that FIG. 12 is a sectional view looking towards the front of the upstream and downstream modules. The baseplate 65b is associated with the upstream module, and the baseplate 85b is associated with the downstream module. The baseplate 65b of the upstream module has an undercut portion 200 (i.e., notch portion) in the vicinity of the slot 68b of the baseplate 65b.

The pin attachment plate 72b is positioned in the undercut portion 200 when the screws (only screw 73b is shown in FIG. 12) fasten the pin 50b and the plate 72b together to the baseplate 65b. The pin 50b shown in FIG. 12 has a straight central portion 51b. With the presence of the undercut portion 200 in the baseplate 65b and with parts fastened together as shown in FIG. 12, the position of the top surface of the baseplate 65b of the upstream module in the vertical direction is higher than the position of the top surface of the baseplate 85b of the downstream module. Accordingly, a waterfall effect from the upstream baseplate to the downstream baseplate is created.

Figure 13:
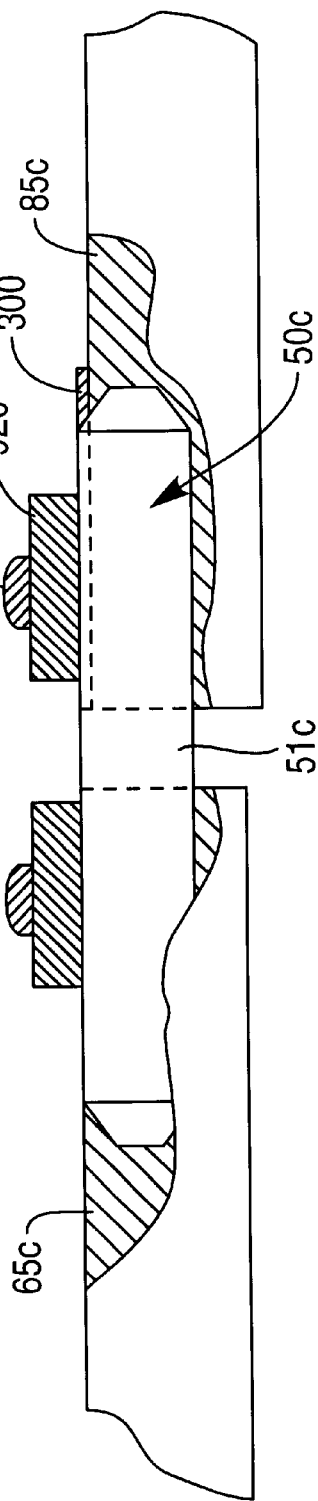
FIG. 13 is another sectional view, with certain parts removed, of upstream and downstream baseplates in accordance with a fourth embodiment of the present invention.

A fourth embodiment of the present invention is illustrated in FIG. 13. Since the embodiment of the invention illustrated in FIG. 13 is generally similar to the embodiment illustrated in FIGS. 1–9, similar numerals are utilized to designate similar components, the suffix letter "c" being associated with the embodiment of FIG. 13 to avoid confusion. It should be noted that FIG. 13 is a sectional view looking towards the front of the upstream and downstream modules. The baseplate 65c is associated with the upstream module, and the baseplate 85c is associated with the downstream module. The baseplate 85c of the downstream module has a protrusion portion 300 in the vicinity of the slot 87c of the baseplate 85c.

The pin attachment plate 92c is positioned on the protrusion portion 300 when the screws (only screw 93c is shown in FIG. 13) fasten the pin 50c and the plate 92c together to the baseplate 85c. The pin 50c shown in FIG. 13 has a straight central portion 51c. With the presence of the protrusion portion 300 in the baseplate 85c and with parts fastened together as shown in FIG. 13, the position of the top surface of the baseplate 65c of the upstream module in the vertical direction is higher than the position of the top surface of the baseplate 85c of the downstream module. Accordingly, a waterfall effect from the upstream baseplate to the downstream baseplate is created.

Thus, either the baseplate of an upstream module and/or the baseplate of a downstream module may be modified (such as an undercut or a protrusion associated with at least one of the baseplates, for examples) to accommodate an alignment pin having a straight central portion and first and second pin attachment plates constructed like the pin attachment pin 72 shown in FIG. 7, for examples, to provide the desired waterfall effect from the upstream baseplate to the downstream baseplate.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An apparatus for aligning a document transport path of an upstream module and a document transport path of a downstream module in a document processing system, the apparatus comprising:

a first end portion having a diameter and for aligning with the upstream module;

a second end portion having a diameter which is smaller than the diameter of the first end portion and for aligning with the downstream module such that the document transport path of the upstream module and the document transport path of the downstream module align with each other; and wherein at least one of the first and second end portions includes a threaded hole in the side thereof for enabling that end portion to be secured to an associated module.

2. An apparatus according to claim 1, further comprising a central portion which interconnects the first and second end portions to provide a stepped surface which extends between the first and second end portions.

3. An apparatus according to claim 1, further comprising a central portion which interconnects the first and second end portions to provide a tapered surface which extends between the first and second end portions.

4. An apparatus according to claim 1, further comprising an attachment plate having a center hole receiving a screw into said threaded hole for fixedly joining said plate to said at least one end portion.

5. An apparatus according to claim 1, wherein both of the first and second end portions include threaded holes in the sides thereof for enabling those end portions to be secured to an associated module.

6. An apparatus comprising:

an upstream module including means defining a document transport path portion;

a downstream module including means defining a document transport path portion; and means for aligning the modules with vertical differential therebetween such that a waterfall effect is created from the document path portion of the upstream module to the document path portion of the downstream module.

7. An apparatus according to claim 6, wherein the aligning means comprises a pin including (i) a first end portion having a diameter and for aligning with the upstream module, and (ii) a second end portion having a diameter which is smaller than the diameter of the first end portion and for aligning with the downstream module such that the document transport path of the upstream module and the document transport path of the downstream module align with each other.

8. An apparatus according to claim 7, further comprising a central portion which interconnects the first and second end portions to provide a stepped surface which extends between the first and second end portions.

9. An apparatus according to claim 7, further comprising a central portion which interconnects the first and second end portions to provide a tapered surface which extends between the first and second end portions.

10. An apparatus according to claim 6, wherein the aligning means comprises (i) a pin and (ii) a pin attachment plate including means defining an undercut portion which engages the pin to allow the document transport path of the upstream module and the document transport path of the downstream module to align with each other such that the waterfall effect is created from the document path portion of the upstream module to the document path portion of the downstream module.

11. An apparatus according to claim 6, wherein the aligning means comprises (i) a pin and (ii) a baseplate including means defining a protrusion portion which engages the pin to allow the document transport path of the upstream module and the document transport path of the downstream module to align with each other such that the waterfall effect is created from the document path portion of the upstream module to the document path portion of the downstream module.

12. An apparatus comprising:
an upstream module including means defining a document transport path portion;
a downstream module including means defining a document transport path portion; and
a pin including (i) a first end portion having a diameter and for aligning with the upstream module, and (ii) a second end portion having a diameter which is smaller than the diameter of the first end portion and for aligning with the downstream module, with said pin being fixedly attached to both said upstream and downstream modules to effect a vertical height differential therebetween such that the document transport path of the upstream module and the document transport path of the downstream module align with each other.

13. An apparatus according to claim 12, further comprising a central portion which interconnects the first and second end portions to provide a stepped surface which extends between the first and second end portions.

14. An apparatus according to claim 13, wherein at least one of the first and second end portions includes means defining a threaded hole for enabling that end portion to be secured to an associated module.

15. An apparatus according to claim 13, wherein each of the first and second end portions includes means defining a threaded hole for enabling that end portion to be secured to an associated module.

16. An apparatus according to claim 12, further comprising a central portion which interconnects the first and second end portions to provide a tapered surface which extends between the first and second end portions.

17. An apparatus for aligning a document transport path of an upstream module and a document transport path of a downstream module in a document processing system, the apparatus comprising:
an alignment pin having first and second opposite end portions for aligning together said upstream and downstream modules;
said first end portion having a first threaded hole in a side thereof; and
said second end portion having a second threaded hole in a side thereof.

18. An apparatus according to claim 17 wherein said pin end portions are cylindrical at said first and second holes.

19. An apparatus according to claim 18 further comprising a pair of attachment plates, each having a center hole for receiving a screw into a corresponding one of said threaded holes for attaching said plates to said pin transversely thereto.

20. An apparatus according to claim 19 wherein each of said plates is rectangular, with a continuous flat side facing said pin through which said center hole is disposed.

21. An apparatus according to claim 19 wherein each of said plates is rectangular, with an undercut at said center hole for engaging said pin.

22. An apparatus according to claim 19 wherein said pin first end portion has a larger diameter than said pin second end portion, with a step in diameter in a central portion of said pin therebetween.

23. A method of using said alignment apparatus according to claim 19 comprising:
inserting said pin first end portion into a first slot in said upstream module;
attaching a first one of said plates to said pin first end portion and to said upstream module;
moving said downstream module next to said upstream module and inserting said pin second end portion into a corresponding second slot in said downstream module; and
attaching a second one of said plates to said pin second end portion and to said downstream module.

24. A method according to claim 23 further comprising mounting said pin in said upstream and downstream modules to effect a waterfall step in said transport path, with said downstream module being lower than said upstream module.

25. A method according to claim 24 wherein:
said pin first end portion has a larger diameter than said pin second end portion, with a stepped surface therebetween; and
said attachment plates fixedly join said pin to said upstream and downstream modules with a step in said transport path therebetween corresponding to said stepped surface of said pin.

26. A method according to claim 24 wherein:
said pin first and second end portions have the same diameter; and
one of said attachment plates has an undercut at said center hole thereof for engaging said pin to effect said waterfall step.

27. A method according to claim 24 wherein:
said pin has a straight central portion between said first and second end portions; and
said upstream module includes an undercut portion at said first slot for receiving said pin to position said upstream module higher than said downstream module.

28. A method according to claim 24 wherein:
said pin has a straight central portion between said first and second end portions; and
said downstream module includes a protrusion at said second slot on which said second attachment plate is mounted to position said downstream module lower than said upstream module.

* * * * *